(12) United States Patent
Liang et al.

(10) Patent No.: US 9,083,400 B2
(45) Date of Patent: Jul. 14, 2015

(54) MULTI-ANTENNA SIGNAL PROCESSING METHOD AND DEVICE IN UPLINK SYSTEM

(75) Inventors: Chunli Liang, Shenzhen (CN); Shuqiang Xia, Shenzhen (CN); Weiwei Yang, Shenzhen (CN); Yuxin Wang, Shenzhen (CN); Peng Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/131,321

(22) PCT Filed: Dec. 28, 2011

(86) PCT No.: PCT/CN2011/084800
§ 371 (c)(1),
(2), (4) Date: Jan. 7, 2014

(87) PCT Pub. No.: WO2012/152038
PCT Pub. Date: Nov. 15, 2012

(65) Prior Publication Data
US 2014/0140430 A1  May 22, 2014

(30) Foreign Application Priority Data
Jul. 8, 2011 (CN) .......................... 2011 1 0191492

(51) Int. Cl.
*H04L 27/00* (2006.01)
*H04B 7/04* (2006.01)
(Continued)

(52) U.S. Cl.
CPC ............ *H04B 7/0456* (2013.01); *H04B 7/0413* (2013.01); *H04B 7/068* (2013.01); *H04B 7/0619* (2013.01); *H04L 1/06* (2013.01)

(58) Field of Classification Search
CPC .... H04B 7/0456; H04B 7/068; H04B 7/0619; H04B 7/0413; H04L 1/06

USPC .......................................... 375/299
See application file for complete search history.

(56) References Cited

U.S. PATENT DOCUMENTS

2009/0304109 A1* 12/2009 Kotecha ........................ 375/299
2010/0002790 A1*  1/2010 Onggosanusi et al. ....... 375/260
(Continued)

FOREIGN PATENT DOCUMENTS

CN   102119494 A   7/2011
CN   102340341 A   2/2012

OTHER PUBLICATIONS

International Search Report in international application No. PCT/CN2011/084800, Nov. 15, 2012.
(Continued)

*Primary Examiner* — Juan A Torres
(74) *Attorney, Agent, or Firm* — Oppedahl Patent Law Firm LLC (57) ABSTRACT

The disclosure discloses a multi-antenna signal processing method in an uplink system. The method includes that: after scrambling, modulation, layer mapping, pre-coding, transmission pre-coding, resource mapping and Single Carrier Frequency Division Multiple Access (SC-FDMA) signal generation are performed successively on a coded bit sequence corresponding to each codeword, a resulted signal is transmitted from each transmitting antenna port. The disclosure also provides a multi-antenna signal processing device in an uplink system. With the method and the device according to the disclosure, a lower Peak-to-Average Power Ratio (PAPR) or Cubic Metric (CM) of a signal to be sent can be ensured without imposing any constraint on a pre-coding matrix, thus reducing the cost and power consumption of a terminal whiling increasing transmission performance of the system.

10 Claims, 3 Drawing Sheets (51) Int. Cl.
*H04B 7/06* (2006.01)
*H04L 1/06* (2006.01)

(56) References Cited

U.S. PATENT DOCUMENTS

| | | | |
|---|---|---|---|
| 2010/0039928 A1 | 2/2010 | Noh | |
| 2010/0067368 A1 | 3/2010 | Lee | |
| 2010/0104034 A1* | 4/2010 | Nam et al. | 375/260 |
| 2010/0172424 A1* | 7/2010 | Perets et al. | 375/260 |
| 2010/0172430 A1* | 7/2010 | Melzer et al. | 375/267 |
| 2010/0208578 A1* | 8/2010 | Lee et al. | 370/210 |
| 2010/0220800 A1* | 9/2010 | Erell et al. | 375/267 |
| 2011/0044313 A1* | 2/2011 | Jeong et al. | 370/344 |
| 2011/0051834 A1* | 3/2011 | Lee et al. | 375/267 |
| 2011/0128917 A1* | 6/2011 | Ko et al. | 370/328 |
| 2011/0158219 A1* | 6/2011 | Ko et al. | 370/344 |
| 2011/0164584 A1* | 7/2011 | Seo et al. | 370/329 |
| 2011/0216846 A1* | 9/2011 | Lee et al. | 375/295 |
| 2011/0261775 A1* | 10/2011 | Kim et al. | 370/329 |
| 2011/0310994 A1* | 12/2011 | Ko et al. | 375/295 |
| 2012/0027004 A1* | 2/2012 | Ko et al. | 370/344 |
| 2012/0093253 A1* | 4/2012 | Park et al. | 375/285 |
| 2012/0201187 A1* | 8/2012 | Koo et al. | 370/312 |
| 2012/0207145 A1* | 8/2012 | Han et al. | 370/342 |
| 2012/0250663 A1* | 10/2012 | Han et al. | 370/336 |
| 2012/0294244 A1* | 11/2012 | Comeau | 370/329 |
| 2013/0077593 A1* | 3/2013 | Han et al. | 370/329 |
| 2013/0083743 A1* | 4/2013 | Koo et al. | 370/329 |
| 2013/0279466 A9* | 10/2013 | Lee et al. | 370/330 |

OTHER PUBLICATIONS

English Translation of the Written Opinion of the International Search Authority in international application No. PCT/CN2011/084800, Jan. 8, 2014.
Supplementary European Search Report in European application No. 11865038.1, mailed on Feb. 26, 2015.
"Uplink SU MIMO with simple layer interleaving" Draft. 3GPP TSG RAN WG1 Meeting #55bis; R1-090271 Jan. 8, 2009.
"Codeword Shifting for Clustered DFT-S-OFDM and N x DFT-S-OFDM for LTE-Advanced Uplink SU-MIMO." 3GPP TSG RAN WG1 Meeting #56bis; R1-091480, Seoul, Korea; Mar. 18, 2009.
"PDCCH coverage in narrow band widths" 3GPP 3GPP TSG RAN WG1 Meeting #53; R1-082259, Kansas City, MO May 20, 2008.

* cited by examiner

Fig.1

—Prior Art—

Fig.2

—Prior Art—

MULTI-ANTENNA SIGNAL PROCESSING METHOD AND DEVICE IN UPLINK SYSTEM

TECHNICAL FIELD

The disclosure relates to Multiple Input Multiple Output (MIMO) techniques, and in particular to a multi-antenna signal processing method and device in an uplink system.

BACKGROUND

In wireless communication, if multiple antennas are used by both a transmitter and a receiver to transmit and receive signals, then a higher data rate may be obtained by spatial multiplexing, that is, multiple data streams may be sent at the transmitter using the same time-frequency resource, a channel coefficient matrix may be obtained at the receiver through channel estimation, and then data in each data stream may be demodulated.

Figure 1:
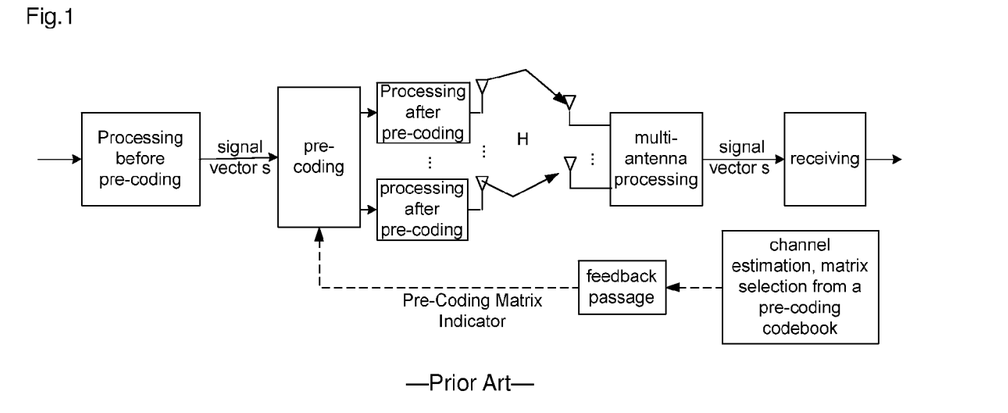
FIG. 1 is a schematic diagram of a flow of MIMO signal processing by close-loop spatial multiplexing in related art.

Spatial multiplexing includes open-loop spatial multiplexing and close-loop spatial multiplexing. FIG. 1 is a schematic diagram of a flow of MIMO signal processing by close-loop spatial multiplexing in related art. As shown in FIG. 1, with close-loop spatial multiplexing, a transmitter performs pre-coding on a signal according to Channel State Information (CSI); here, one way for the transmitter to acquire CSI is to acquire CSI through feedback by the receiver. Generally, in order to reduce the overhead of the feedback, the receiver and the transmitter save the same codebook, that is, a pre-coding matrix set; the receiver selects a proper pre-coding matrix from the codebook according to current channel condition, and feeds back, to the transmitter, a Pre-Coding Matrix Indicator (PMI) of the selected pre-coding matrix in the pre-coding matrix set; then, the transmitter finds the pre-coding matrix according to the PMI feed back, and performs pre-coding on the signal to be sent. With open-loop spatial multiplexing, the transmitter does not perform pre-coding on the signal according to the CSI sent by the receiver, but according to a predetermined fixed codebook combination.

Figure 2:
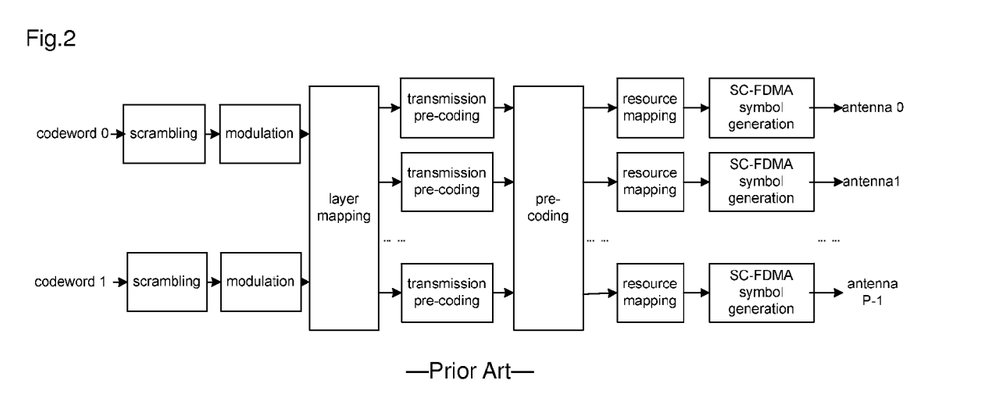
FIG. 2 is a schematic diagram of signal processing at a transmitter adopting SU-MIMO techniques.

In the next-generation evolution of a Long Term Evolution (LTE) system, that is, an LTE-Advanced (LTE-A) system, in order to obtain a higher data rate, Single User MIMO (SU-MIMO) techniques are adopted for an uplink of the LTE-A system, wherein a terminal serves as a transmitter and a base station serves as a receiver, and the direction from the terminal to the base station is an uplink direction. The SU-MIMO techniques belong to close-loop spatial multiplexing. FIG. 2 is a schematic diagram of signal processing at a transmitter adopting uplink SU-MIMO techniques; as shown in FIG. 2, coded bit sequences corresponding to codeword 0 and codeword 1 of an uplink signal of the terminal are scrambled and then modulated respectively to obtain complex symbols corresponding to the respective codewords; then, the codeword 0 and the codeword 1 forming the complex symbols are subjected to layer mapping to obtain data of layer 0 and of layer 1 respectively; next, the obtained data of the layers are subjected to transmission pre-coding so as to be converted from a time-domain signal into a frequency-domain signal; the signal is then subjected to pre-coding in the frequency domain, resource mapping, and then Single Carrier Frequency Division Multiple Access (SC-FDMA) symbol generation before finally being transmitted on the antennas. Here, the transmission pre-coding refers to Discrete Fourier Transform (DFT).

In the above method, a codeword-to-layer mapping module of the terminal implements the codeword-to-layer mapping by simple serial/parallel conversion. In the LTE-A system, a codeword-to-layer mapping mode as shown in the following table is adopted in the SU-MIMO.

| Number of layers | Number of codewords | codeword-to-layer Mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |

In the table, $d^{(q)}(0), d^{(q)}(1), \ldots, d^{(q)}(M_{symb}^{(q)}-1)$ each represents a modulated complex symbol corresponding to codeword q, $q \in \{0,1\}$; $M_{symb}^{(q)}$ represents the number of modulated complex symbols corresponding to codeword q; $x^{(v)}(0), x^{(v)}(1), \ldots, x^{(v)}(M_{symb}^{layer}-1)$ each represents a modulated complex symbol corresponding to layer v, $v \in \{0, 1, 2, 3\}$; $M_{symb}^{layer}$ presents the number of modulated complex symbols corresponding to one layer.

In order to obtain a higher transmission rate, the LTE-A system supports the configuration of four uplink sending antennas. Limited transmitting power of the terminal greatly affects uplink-transmission-technique selection. However, with multi-carrier techniques such as Orthogonal Frequency Division Multiplexing (OFDM), multiple independent sub-carriers are used together, and the signal to be sent has a very high Peak-to-Average Power Ratio (PAPR), which brings about many disadvantages, for example, increased complexity of analog-to-digital conversion and digital-to-analog conversion and reduced radio-power-amplifier efficiency, thereby increasing the cost and power consumption of a power amplifier of a transmitter. Due to limited cost and power consumption of a terminal, it is not advantageous to implement multi-carrier techniques on an uplink. Therefore, in order to ensure a low PAPR or Cubic Metric (CM) of the signal to be sent, in the LTE-A system, SC-FDMA is adopted in uplink transmission; specifically, Discrete Fourier Transform Spread Orthogonal Frequency Division Multiplexing (DFT-S-OFDM) is adopted. Here, the CM is an index for measuring nonlinear influence on the power amplifier, which index is more accurate than the PAPR.

As shown in FIG. 2, generally, in an uplink of the LTE-A system, data of a layer are subjected to transmission pre-coding before the pre-coding; in which case, in order to ensure that the signal to be sent has a low PAPR or CM, factors such as PARP or CM should be taken into account in designing the codebook of pre-coding matrices; therefore, for codebook design, there is one more constraint, for example, of adopting a CM Preserved (CMP) design. In a practical application, all pre-coding matrices ultimately adopted in LTE-A uplink close-loop spatial multiplexing ensure that the uplink signal to be sent has a lower PAPR or CM.

In the LTE-A system, since a typical scenario in application is of moderate/low mobility, multi-antenna techniques with open-loop spatial multiplexing are not supported. However, in a subsequent version of LTE-A, such as Release-11, a scenario of high mobility is reconsidered as a primary direction for optimization of the subsequent version. When a terminal moves with a high speed, for example, up to 350 km/h, due to a fast changing channel status, CSI-feedback-based close-loop spatial multiplexing would degrade system performance, in which case, it is more reasonable to adopt open-loop spatial multiplexing. In this case, if it is to adopt in uplink open-loop spatial multiplexing a sequence of signal processing similar to that in uplink close-loop spatial multiplexing, that is, pre-coding is conducted after transmission pre-coding, then in order to ensure that the signal to be sent has a low PAPR or CM, there also are constraints on the design and selection of the codebook of pre-coding matrices; therefore, there is a pressing need for improved open-loop multiplexing in a subsequent version of the LTE-A.

SUMMARY

In view of this, it is desired that the disclosure provides a multi-antenna signal processing method and device in an uplink system, capable of ensuring a lower PAPR or CM of a signal to be sent without imposing any constraint on a pre-coding matrix, thus reducing the cost and power consumption of a terminal.

To this end, a technical scheme of the disclosure is realized as follows.

The disclosure provides a multi-antenna signal processing method in an uplink system, including that:

after scrambling, modulation, layer mapping, pre-coding, transmission pre-coding, resource mapping and Single Carrier Frequency Division Multiple Access (SC-FDMA) signal generation are performed successively on a coded bit sequence corresponding to each codeword, a resulted signal is transmitted from each transmitting antenna port.

Wherein, the layer mapping may be performed by:

processing a modulated complex symbol corresponding to each codeword with a mapping-and-layer-interleaving matrix.

Wherein, the processing a modulated complex symbol corresponding to each codeword with a mapping-and-layer-interleaving matrix may be:

when 1 codeword is mapped to 2 layers, then:

$$\begin{pmatrix} x^{(0)}(i) \\ x^{(1)}(i) \end{pmatrix} = Q_1 \begin{pmatrix} d^{(0)}(2i) \\ d^{(0)}(2i+1) \end{pmatrix};$$

$$Q_1 = \begin{bmatrix} 1 & 0 \\ 0 & 1 \end{bmatrix};$$

$$i = 0, 1, \ldots, M_{symb}^{layer} - 1, M_{symb}^{layer} = M_{symb}^{(0)}/2;$$

When 2 codewords are mapped to 2 layers, then:

$$\begin{pmatrix} x^{(0)}(i) \\ x^{(1)}(i) \end{pmatrix} = Q_2(i \bmod 2) \begin{pmatrix} d^{(0)}(i) \\ d^{(1)}(i) \end{pmatrix};$$

$$Q_2(0) = \begin{pmatrix} 1 & 0 \\ 0 & 1 \end{pmatrix}, Q_2(1) = \begin{pmatrix} 0 & 1 \\ 1 & 0 \end{pmatrix};$$

$$i = 0, 1, \ldots, M_{symb}^{layer} - 1, M_{symb}^{layer} = M_{symb}^{(0)} = M_{symb}^{(1)};$$

When 2 codewords are mapped to 3 layers, then:

$$\begin{pmatrix} x^{(0)}(i) \\ x^{(1)}(i) \\ x^{(2)}(i) \end{pmatrix} = Q_3(i \bmod 3) \begin{pmatrix} d^{(0)}(i) \\ d^{(1)}(2i) \\ d^{(1)}(2i+1) \end{pmatrix};$$

$$Q_3(0) = \begin{pmatrix} 1 & 0 & 0 \\ 0 & 1 & 0 \\ 0 & 0 & 1 \end{pmatrix}, Q_3(1) = \begin{pmatrix} 0 & 0 & 1 \\ 1 & 0 & 0 \\ 0 & 1 & 0 \end{pmatrix}, Q_3(2) = \begin{pmatrix} 0 & 1 & 0 \\ 0 & 0 & 1 \\ 1 & 0 & 0 \end{pmatrix};$$

$$i = 0, 1, \ldots, M_{symb}^{layer} - 1, M_{symb}^{layer} = M_{symb}^{(0)} = M_{symb}^{(1)}/2;$$

When 2 codewords are mapped to 4 layers, then:

$$\begin{pmatrix} x^{(0)}(i) \\ x^{(1)}(i) \\ x^{(2)}(i) \\ x^{(3)}(i) \end{pmatrix} = Q_4(i \bmod 4) \begin{pmatrix} d^{(0)}(2i) \\ d^{(0)}(2i+1) \\ d^{(1)}(2i) \\ d^{(1)}(2i+1) \end{pmatrix};$$

$$Q_4(0) = \begin{pmatrix} 1 & 0 & 0 & 0 \\ 0 & 1 & 0 & 0 \\ 0 & 0 & 1 & 0 \\ 0 & 0 & 0 & 1 \end{pmatrix}, Q_4(1) = \begin{pmatrix} 0 & 0 & 0 & 1 \\ 1 & 0 & 0 & 0 \\ 0 & 1 & 0 & 0 \\ 0 & 0 & 1 & 0 \end{pmatrix},$$

$$Q_4(2) = \begin{pmatrix} 0 & 0 & 1 & 0 \\ 0 & 0 & 0 & 1 \\ 1 & 0 & 0 & 0 \\ 0 & 1 & 0 & 0 \end{pmatrix}, Q_4(3) = \begin{pmatrix} 0 & 1 & 0 & 0 \\ 0 & 0 & 1 & 0 \\ 0 & 0 & 0 & 1 \\ 1 & 0 & 0 & 0 \end{pmatrix};$$

$$i = 0, 1, \ldots, M_{symb}^{layer} - 1, M_{symb}^{layer} = M_{symb}^{(0)}/2 = M_{symb}^{(1)}/2;$$

where i mod y represents calculating a remainder in dividing i by y, y∈{2,3,4}; $d^{(q)}(0), d^{(q)}(1), \ldots, d^{(q)}(M_{symb}^{(q)}-1)$ each represents a modulated complex symbol corresponding to a codeword q, q∈{0,1}; $M_{symb}^{(q)}$ represents a number of modulated complex symbols corresponding to the codeword q; $x^{(v)}(0), x^{(v)}(1), \ldots, x^{(v)}(M_{symb}^{layer}-1)$ each represents a modulated complex symbol corresponding to a layer v, v∈{0, 1,2,3}; and $M_{symb}^{layer}$ represents a number of modulated complex symbols corresponding to one layer.

The method may further include that: when the pre-coding is performed, an adopted pre-coding matrix is varied according to each complex symbol, or according to an SC-FDMA symbol, or according to a time slot.

The method may further include that: before the pre-coding is performed, a terminal and a base station agree on a rule for varying the pre-coding matrix.

The method may further include that: after the transmission pre-coding is performed and before the resource mapping is performed, antenna delaying is performed on a complex symbol corresponding to each transmitting antenna port that has gone through transmission pre-coding, to obtain a complex symbol corresponding to each transmitting antenna port that has gone through antenna delaying; and correspondingly, the resource mapping may be performed on the complex symbol corresponding to each transmitting antenna port that has gone through antenna delaying.

The method may further include that: before the antenna delaying is performed, an antenna delaying matrix is set according to a number of transmitting antenna ports, a number of layers and a pre-coding matrix.

Wherein, when the number of transmitting antenna ports is 2 and the number of layers is 1, the antenna delaying matrix may be:

$$D(i) = \begin{bmatrix} 1 & 0 \\ 0 & e^{-j2\pi i/2} \end{bmatrix};$$

when the number of transmitting antenna ports is 2 and the number of layers is 2, the antenna delaying matrix may be:

$$D(i) = \begin{bmatrix} 1 & 0 \\ 0 & 1 \end{bmatrix};$$

when the number of transmitting antenna ports is 4 and the number of layers is 1, the antenna delaying matrix may be:

$$D(i) = \begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix};$$

when the number of transmitting antenna ports is 4 and the number of layers is 2, and when the pre-coding matrix adopted is $$\begin{bmatrix} 1 & 0 \\ x & 0 \\ 0 & 1 \\ 0 & y \end{bmatrix} (x, y \in \{1, -1, j, -j\}),$$

the antenna delaying matrix may be:

$$D(i) = \begin{bmatrix} 1 & 0 & 0 & 0 \\ 0 & e^{-j4\pi i/4} & 0 & 0 \\ 0 & 0 & 1 & 0 \\ 0 & 0 & 0 & e^{-j4\pi i/4} \end{bmatrix}$$

or $$D(i) = \begin{bmatrix} 1 & 0 & 0 & 0 \\ 0 & e^{-j4\pi i/4} & 0 & 0 \\ 0 & 0 & e^{-j2\pi i/4} & 0 \\ 0 & 0 & 0 & e^{-j6\pi i/4} \end{bmatrix};$$

when the number of transmitting antenna ports is 4 and the number of layers is 2, and when the pre-coding matrix adopted is $$\begin{bmatrix} 1 & 0 \\ 0 & 1 \\ x & 0 \\ 0 & y \end{bmatrix} (x, y \in \{1, -1, j, -j\}),$$

the antenna delaying matrix may be:

$$D(i) = \begin{bmatrix} 1 & 0 & 0 & 0 \\ 0 & 1 & 0 & 0 \\ 0 & 0 & e^{-j4\pi i/4} & 0 \\ 0 & 0 & 0 & e^{-j4\pi i/4} \end{bmatrix}$$

or $$D(i) = \begin{bmatrix} 1 & 0 & 0 & 0 \\ 0 & e^{-j4\pi i/4} & 0 & 0 \\ 0 & 0 & e^{-j2\pi i/4} & 0 \\ 0 & 0 & 0 & e^{-j6\pi i/4} \end{bmatrix};$$

when the number of transmitting antenna ports is 4 and the number of layers is 2, and when the pre-coding matrix adopted is $$\begin{bmatrix} 1 & 0 \\ 0 & 1 \\ 0 & y \\ x & 0 \end{bmatrix} (x, y \in \{1, -1, j, -j\}),$$

the antenna delaying matrix may be:

$$D(i) = \begin{bmatrix} 1 & 0 & 0 & 0 \\ 0 & 1 & 0 & 0 \\ 0 & 0 & e^{-j4\pi i/4} & 0 \\ 0 & 0 & 0 & e^{-j4\pi i/4} \end{bmatrix}$$

or $$D(i) = \begin{bmatrix} 1 & 0 & 0 & 0 \\ 0 & e^{-j2\pi i/4} & 0 & 0 \\ 0 & 0 & e^{-j6\pi i/4} & 0 \\ 0 & 0 & 0 & e^{-j4\pi i/4} \end{bmatrix};$$

wherein i=0, 1, . . . , $M_{symb}^{ap}-1$; $M_{symb}^{ap}$ represents a number of modulated complex symbols corresponding to each antenna port; $M_{symb}^{ap}=M_{symb}^{layer}$; j represents an imaginary unit.

The disclosure further provides a multi-antenna signal processing device in an uplink system, including: a scrambling module, a modulation module, a layer mapping module, a pre-coding module, a transmission pre-coding module, a resource mapping module and a Single Carrier Frequency Division Multiple Access (SC-FDMA) signal generation module, wherein the scrambling module is configured to scramble a coded bit sequence corresponding to each codeword and to send a scrambled bit sequence corresponding to each codeword to the modulation module;

the modulation module is configured to modulate the scrambled bit sequence corresponding to each codeword and to send a modulated complex symbol corresponding to each codeword to the layer mapping module;

the layer mapping module is configured to perform layer mapping on the modulated complex symbol corresponding to each codeword and to send an obtained complex symbol on each layer to the pre-coding module;

the pre-coding module is configured to perform pre-coding on the complex symbol on each layer and to send an obtained complex symbol corresponding to each transmitting antenna port to the transmission pre-coding module;

the transmission pre-coding module is configured to perform transmission pre-coding on the complex symbol corresponding to each transmitting antenna port and to send an obtained complex symbol corresponding to each transmitting antenna port that has gone through transmission pre-coding to the resource mapping module;

the resource mapping module is configured to perform resource mapping on the complex symbol corresponding to each transmitting antenna port that has gone through transmission pre-coding and to send an obtained complex symbol corresponding to each transmitting antenna port that has gone through resource mapping to the SC-FDMA signal generation module; and the SC-FDMA signal generation module is configured to perform SC-FDMA signal generation on the complex symbol corresponding to each transmitting antenna port that has gone through resource mapping and to transmit a resulted signal from each transmitting antenna port.

The device may further include:

an antenna delaying module configured to perform antenna delaying on the complex symbol corresponding to each transmitting antenna port that has gone through transmission pre-coding and to send an obtained complex symbol corresponding to each transmitting antenna port that has gone through antenna delaying to the resource mapping module;

the transmission pre-coding module may be further configured to send the obtained complex symbol corresponding to each transmitting antenna port that has gone through transmission pre-coding to the antenna delaying module; and the resource mapping module may be further configured to perform the resource mapping on the complex symbol corresponding to each transmitting antenna port that has gone through antenna delaying.

With the multi-antenna signal processing method and device in an uplink system provided by the disclosure, after scrambling, modulation, layer mapping, pre-coding, transmission pre-coding, resource mapping and SC-FDMA signal generation are performed successively on a coded bit sequence corresponding to each codeword, a resulted signal is transmitted from each transmitting antenna port, wherein the pre-coding of an uplink signal is conducted before the transmission pre-coding, thereby enabling a lower PAPR or CM of a signal to be sent without imposing any constraint on selection of a pre-coding matrix, thus reducing the cost and power consumption of a terminal; meanwhile, as no constraint is imposed on selection of the pre-coding matrix, all existing pre-coding matrices can be used, thereby increasing performance of pre-coding as well as increasing transmission performance of the system.

In addition, a pre-coding matrix base station varies according to each complex symbol, thus achieving a better pre-coding gain. A terminal and the base station agree in advance on a rule for varying pre-coding matrix without the need of instruction by any signalling, thereby reducing a signalling overhead.

In addition, antenna delaying is performed on a complex symbol corresponding to each transmitting antenna port that has gone through transmission pre-coding, to obtain a complex symbol corresponding to each transmitting antenna port that has gone through antenna delaying; and resource mapping is performed on the complex symbol corresponding to each transmitting antenna port that has gone through antenna delaying, which adds to the diversity of data of each layer on a transmitting antenna, thereby implementing transmit diversity and further increasing the transmission performance of system.

DETAILED DESCRIPTION

According to embodiments of the disclosure, after scrambling, modulation, layer mapping, pre-coding, transmission pre-coding, resource mapping and SC-FDMA signal generation are performed successively on a coded bit sequence corresponding to each codeword, a resulted signal is transmitted from each transmitting antenna port.

The disclosure is further elaborated below with reference to accompanying drawings and specific embodiments.

Figure 3:
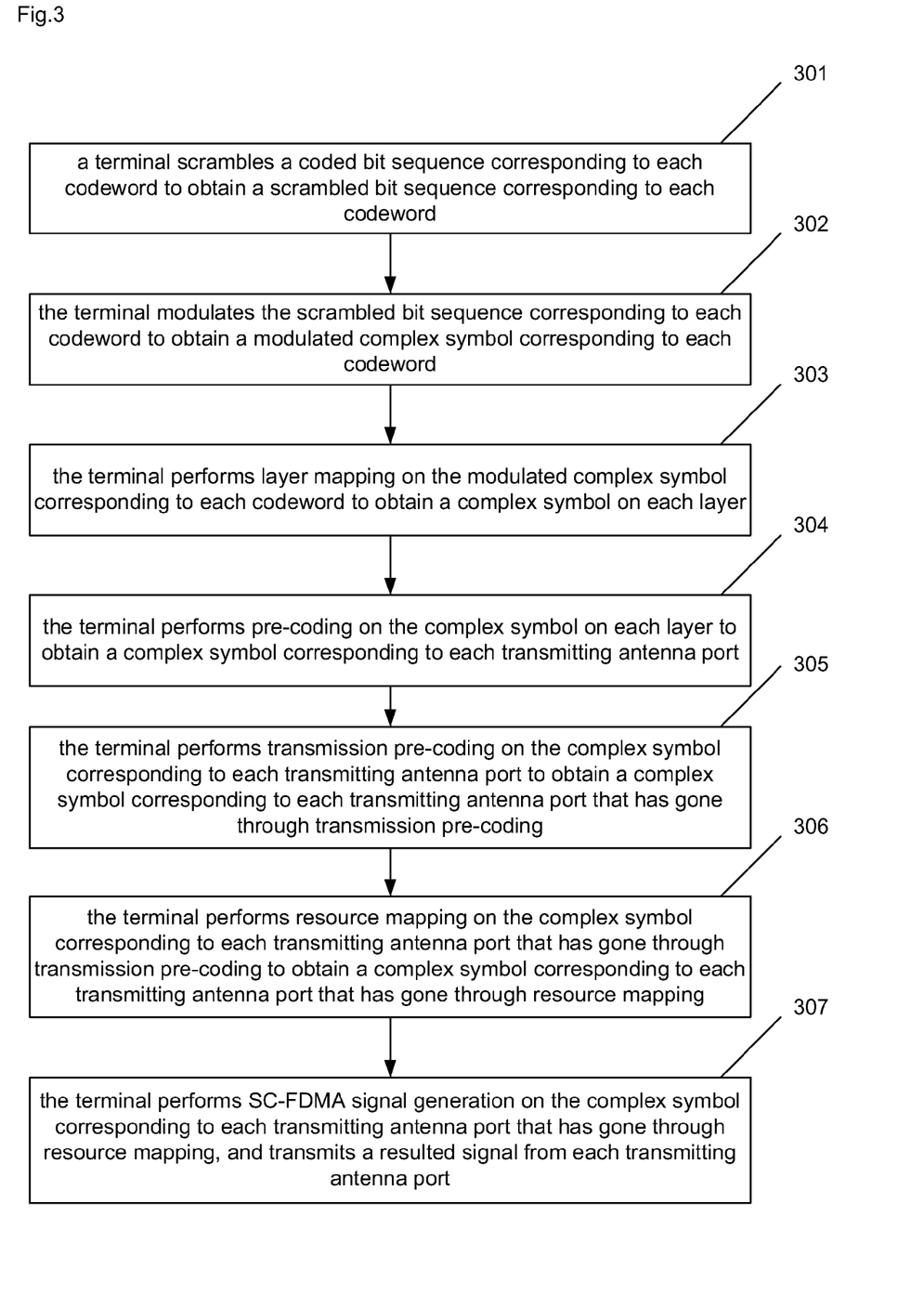
FIG. 3 is a flowchart of a multi-antenna signal processing method in an uplink system according to the disclosure.

A multi-antenna signal processing method in an uplink system according to the disclosure, as shown in FIG. 3, includes the following steps.

Step 301: a terminal scrambles a coded bit sequence corresponding to each codeword to obtain a scrambled bit sequence corresponding to each codeword.

Here, please refer to existing techniques for specific implementation of this step, which is not elaborated here.

Step 302: the terminal modulates the scrambled bit sequence corresponding to each codeword to obtain a modulated complex symbol corresponding to each codeword.

Here, please refer to existing techniques for specific implementation of this step, which is not elaborated here.

Step 303: the terminal performs layer mapping on the modulated complex symbol corresponding to each codeword to obtain a complex symbol on each layer.

Specifically, the modulated complex symbol corresponding to each codeword is processed with a mapping-and-layer-interleaving matrix.

Step 304: the terminal performs pre-coding on the complex symbol on each layer to obtain a complex symbol corresponding to each transmitting antenna port.

Here, during the pre-coding, an adopted pre-coding matrix may be varied according to each complex symbol, or according to an SC-FDMA symbol, or according to a time slot.

Step 305: the terminal performs transmission pre-coding on the complex symbol corresponding to each transmitting antenna port to obtain a complex symbol corresponding to each transmitting antenna port that has gone through transmission pre-coding.

Here, the transmission pre-coding is performed by transforming a time-domain signal into a frequency domain signal specifically through a DFT operation.

Here, please refer to existing techniques for specific implementation of this step, which is not elaborated here.

Step 306: the terminal performs resource mapping on the complex symbol corresponding to each transmitting antenna port that has gone through transmission pre-coding to obtain a complex symbol corresponding to each transmitting antenna port that has gone through resource mapping.

Here, the resource mapping is performed by mapping a complex symbol to a corresponding physical resource unit sending the complex symbol.

Please refer to existing techniques for specific implementation of this step, which is not elaborated here.

Before Step 306, the method may further include that:

antenna delaying is performed on a complex symbol corresponding to each transmitting antenna port that has gone through transmission pre-coding, to obtain a complex symbol corresponding to each transmitting antenna port that has gone through antenna delaying;

correspondingly, the resource mapping may be performed on the complex symbol corresponding to each transmitting antenna port that has gone through antenna delaying.

Step 307: the terminal performs SC-FDMA signal generation on the complex symbol corresponding to each transmitting antenna port that has gone through resource mapping, and transmits a resulted signal from each transmitting antenna port.

Here, the SC-FDMA signal generation is performed by generating a time-domain signal to be sent on each transmitting antenna according to an SC-FDMA-symbol-generating method.

Please refer to existing techniques for specific implementation of this step, which is not elaborated here.

The disclosure is further elaborated below with embodiments.

Embodiment 1

In this embodiment, the layer mapping may be performed on the modulated complex symbol corresponding to each codeword specifically by:

processing the modulated complex symbol corresponding to each codeword with a mapping-and-layer-interleaving matrix.

Specifically, when 1 codeword is mapped to 2 layers, then:

$$\begin{pmatrix} x^{(0)}(i) \\ x^{(1)}(i) \end{pmatrix} = Q_1 \begin{pmatrix} d^{(0)}(2i) \\ d^{(0)}(2i+1) \end{pmatrix};$$

$$Q_1 = \begin{bmatrix} 1 & 0 \\ 0 & 1 \end{bmatrix};$$

$$i = 0, 1, \ldots, M_{symb}^{layer} - 1, M_{symb}^{layer} = M_{symb}^{(0)}/2;$$

When 2 codewords are mapped to 2 layers, then:

$$\begin{pmatrix} x^{(0)}(i) \\ x^{(1)}(i) \end{pmatrix} = Q_2(i \bmod 2) \begin{pmatrix} d^{(0)}(i) \\ d^{(1)}(i) \end{pmatrix};$$

$$Q_2(0) = \begin{pmatrix} 1 & 0 \\ 0 & 1 \end{pmatrix}, Q_2(1) = \begin{pmatrix} 0 & 1 \\ 1 & 0 \end{pmatrix};$$

$$M_{symb}^{layer} = M_{symb}^{(0)} = M_{symb}^{(1)}, i = 0, 1, \ldots, M_{symb}^{layer} - 1;$$

When 2 codewords are mapped to 3 layers, then:

$$\begin{pmatrix} x^{(0)}(i) \\ x^{(1)}(i) \\ x^{(2)}(i) \end{pmatrix} = Q_3(i \bmod 3) \begin{pmatrix} d^{(0)}(i) \\ d^{(1)}(2i) \\ d^{(1)}(2i+1) \end{pmatrix};$$

$$Q_3(0) = \begin{pmatrix} 1 & 0 & 0 \\ 0 & 1 & 0 \\ 0 & 0 & 1 \end{pmatrix}, Q_3(1) = \begin{pmatrix} 0 & 0 & 1 \\ 1 & 0 & 0 \\ 0 & 1 & 0 \end{pmatrix}, Q_3(2) = \begin{pmatrix} 0 & 1 & 0 \\ 0 & 0 & 1 \\ 1 & 0 & 0 \end{pmatrix};$$

$$M_{symb}^{layer} = M_{symb}^{(0)} = M_{symb}^{(1)}/2, i = 0, 1, \ldots, M_{symb}^{layer} - 1;$$

When 2 codewords are mapped to 4 layers, then:

$$\begin{pmatrix} x^{(0)}(i) \\ x^{(1)}(i) \\ x^{(2)}(i) \\ x^{(3)}(i) \end{pmatrix} = Q_4(i \bmod 4) \begin{pmatrix} d^{(0)}(2i) \\ d^{(0)}(2i+1) \\ d^{(1)}(2i) \\ d^{(1)}(2i+1) \end{pmatrix};$$

$$Q_4(0) = \begin{pmatrix} 1 & 0 & 0 & 0 \\ 0 & 1 & 0 & 0 \\ 0 & 0 & 1 & 0 \\ 0 & 0 & 0 & 1 \end{pmatrix}, Q_4(1) = \begin{pmatrix} 0 & 0 & 0 & 1 \\ 1 & 0 & 0 & 0 \\ 0 & 1 & 0 & 0 \\ 0 & 0 & 1 & 0 \end{pmatrix},$$

$$Q_4(2) = \begin{pmatrix} 0 & 0 & 1 & 0 \\ 0 & 0 & 0 & 1 \\ 1 & 0 & 0 & 0 \\ 0 & 1 & 0 & 0 \end{pmatrix}, Q_4(3) = \begin{pmatrix} 0 & 1 & 0 & 0 \\ 0 & 0 & 1 & 0 \\ 0 & 0 & 0 & 1 \\ 1 & 0 & 0 & 0 \end{pmatrix};$$

$$M_{symb}^{layer} = M_{symb}^{(0)}/2 = M_{symb}^{(1)}/2, i = 0, 1, \ldots, M_{symb}^{layer} - 1;$$

where i mod y represents calculating a remainder in dividing i by y, y∈{2,3,4}; $d^{(q)}(0), d^{(q)}(1), \ldots, d^{(q)}(M_{symb}^{(q)}-1)$ each represents a modulated complex symbol corresponding to a codeword q, q∈{0,1}; $M_{symb}^{(q)}$ represents a number of modulated complex symbols corresponding to the codeword q; $x^{(\upsilon)}(0), x^{(\upsilon)}(1), \ldots, x^{(\upsilon)}(M_{symb}^{layer}-1)$ each represents a modulated complex symbol corresponding to a layer υ, υ∈{0, 1,2,3}; and $M_{symb}^{layer}$ represents a number of modulated complex symbols corresponding to one layer.

Here, those skilled in the art should understand that: since i is a variable, $d^{(q)}(0), d^{(q)}(1), \ldots, d^{(q)}(M_{symb}^{(q)}-1)$ are equivalent to $d^{(0)}(2i), d^{(0)}(2i+1), d^{(0)}(i), d^{(1)}(i), d^{(1)}(2i)$, and $d^{(1)}(2i+1)$ in the above formula.

The layer mapping provided by this embodiment aims to map a same codeword to different layers. there may be two ways in specific implementation; one way is to add a new layer interleaving module instead of modifying a layer mapping module in an existing LTE-A system; the other way is to adapt the layer mapping module in the existing LTE-A system such that the layer mapping module serves a layer interleaving function.

Embodiment 2

In this embodiment, a specific process of pre-coding according to the disclosure is illustrated. Pre-coding according to the disclosure is performed before transmission pre-coding, which is significantly different from the case where pre-coding is performed after transmission pre-coding. Specifically, when pre-coding is performed after transmission pre-coding, in order to ensure a low PAPR or CM of the signal to be sent, there will be a limit on codebook selection and variation even if a codebook of pre-coding matrices based on a CMP design is adopted. Particularly, when a codebook is varied based on a modulated symbol or a sub-carrier-level variation, there will be a fairly-limited number of applicable codebooks, seriously affecting the performance of the pre-coding. By contrast, pre-coding in the disclosure is performed before transmission pre-coding, and thus, any existing pre-coding codebook based on a CMP design may be valid as a candidate for the codebook of pre-coding matrices without any limitation. Simulation gives that when the codebook of pre-coding matrices is varied according to a modulated symbol and is randomly selected from existing codebooks in the existing LTE-A system, with the conventional way of performing pre-coding after transmission pre-coding, the CM of the signal to be sent may reach 2.8 or more; however, with the way according to the disclosure, i.e. of performing pre-coding before transmission pre-coding, the CM of the signal to be sent is kept at 1.2. Here, during the simulation, all symbols to be sent are modulated by Quadrature Phase Shift Keying (QPSK).

During pre-coding, the pre-coding matrix may be varied according to each complex symbol, or according to an SC-FDMA symbol, or according to a time slot. In an embodiment, the pre-coding matrix may be varied according to each complex symbol for a better pre-coding gain.

When the pre-coding matrix is varied according to each complex symbol, assuming that the signal entering a pre-coder is $y^{(0)}(i), y^{(1)}(i), \ldots, y^{(\upsilon-1)}(i)$, where $\upsilon$ represents the number of layers, and the signal output by the pre-coder is $z^{(0)}(i), z^{(1)}(i), \ldots, z^{(P-1)}(i)$, where P represents the number of transmitting antenna ports, the process of the pre-coding may then be expressed as follows:

$$\begin{bmatrix} z^{(0)}(i) \\ \vdots \\ z^{(P-1)}(i) \end{bmatrix} = W(i) \begin{bmatrix} y^{(0)}(i) \\ \vdots \\ y^{(D-1)}(i) \end{bmatrix};$$

wherein, W(i) represents a pre-coding matrix selectable from an existing codebook in the LTE-A system, with the size of P×υ; i represents a layer complex symbol indicator.

Here, a terminal and a base station agree in advance on a rule for varying pre-coding matrix without the need of instruction by any signalling. For example, assuming that N pre-coding matrices are selected from existing codebooks in the LTE-A system, the terminal may use one of the N pre-coding matrices successively to complete the pre-coding of data of a layer to an antenna port. As an extreme example, all existing codebooks in the LTE-A system may be selected.

Embodiment 3

In this embodiment, a specific process of antenna delaying according to the disclosure is illustrated.

An antenna delaying matrix is set according to a number of transmitting antenna ports, a number of layers and a pre-coding matrix. The antenna delaying matrix is set on the following basis: when data of the same layer are sent by different transmitting antennas, an interval between cyclic shifts in signal sending between antennas is maximized as possible, so as to maximize the diversity gain of transmitting antennas.

Given below are specific designs of antenna delaying matrix D(i) corresponding to different numbers of transmitting antenna ports, different numbers of layers and different pre-coding matrices.

When the number of transmitting antenna ports is 2 and the number of layers is 1, the antenna delaying matrix is:

$$D(i) = \begin{bmatrix} 1 & 0 \\ 0 & e^{-j2\pi i/2} \end{bmatrix};$$

when the number of transmitting antenna ports is 2 and the number of layers is 2, the antenna delaying matrix is:

$$D(i) = \begin{bmatrix} 1 & 0 \\ 0 & 1 \end{bmatrix};$$

when the number of transmitting antenna ports is 4 and the number of layers is 1, the antenna delaying matrix is:

$$D(i) = \begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix};$$

when the number of transmitting antenna ports is 4 and the number of layers is 2, if the pre-coding matrix adopted is $$\begin{bmatrix} 1 & 0 \\ x & 0 \\ 0 & 1 \\ 0 & y \end{bmatrix} (x, y \in \{1, -1, j, -j\}),$$

then the antenna delaying matrix is:

$$D(i) = \begin{bmatrix} 1 & 0 & 0 & 0 \\ 0 & e^{-j4\pi i/4} & 0 & 0 \\ 0 & 0 & 1 & 0 \\ 0 & 0 & 0 & e^{-j4\pi i/4} \end{bmatrix} \text{ or}$$

$$D(i) = \begin{bmatrix} 1 & 0 & 0 & 0 \\ 0 & e^{-j4\pi i/4} & 0 & 0 \\ 0 & 0 & e^{-j2\pi i/4} & 0 \\ 0 & 0 & 0 & e^{-j6\pi i/4} \end{bmatrix};$$

if the pre-coding matrix adopted is $$\begin{bmatrix} 1 & 0 \\ 0 & 1 \\ x & 0 \\ 0 & y \end{bmatrix} (x, y \in \{1, -1, j, -j\}),$$

then the antenna delaying matrix is:

$$D(i) = \begin{bmatrix} 1 & 0 & 0 & 0 \\ 0 & 1 & 0 & 0 \\ 0 & 0 & e^{-j4\pi i/4} & 0 \\ 0 & 0 & 0 & e^{-j4\pi i/4} \end{bmatrix} \text{ or}$$

$$D(i) = \begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix};$$

and if the pre-coding matrix adopted is $$\begin{bmatrix} 1 & 0 \\ 0 & 1 \\ 0 & y \\ x & 0 \end{bmatrix} (x, y \in \{1, -1, j, -j\}),$$

then the antenna delaying matrix is:

$$D(i) = \begin{bmatrix} 1 & 0 & 0 & 0 \\ 0 & 1 & 0 & 0 \\ 0 & 0 & e^{-j4\pi i/4} & 0 \\ 0 & 0 & 0 & e^{-j4\pi i/4} \end{bmatrix}$$

or $$D(i) = \begin{bmatrix} 1 & 0 & 0 & 0 \\ 0 & e^{-j2\pi i/4} & 0 & 0 \\ 0 & 0 & e^{-j6\pi i/4} & 0 \\ 0 & 0 & 0 & e^{-j4\pi i/4} \end{bmatrix};$$

wherein i=0, 1, ..., $M_{symb}^{ap}-1$, $M_{symb}^{ap}$ represents a number of modulated complex symbols corresponding to each antenna port; $M_{symb}^{ap}=M_{symb}^{layer}$; j represents an imaginary unit.

Figure 4:
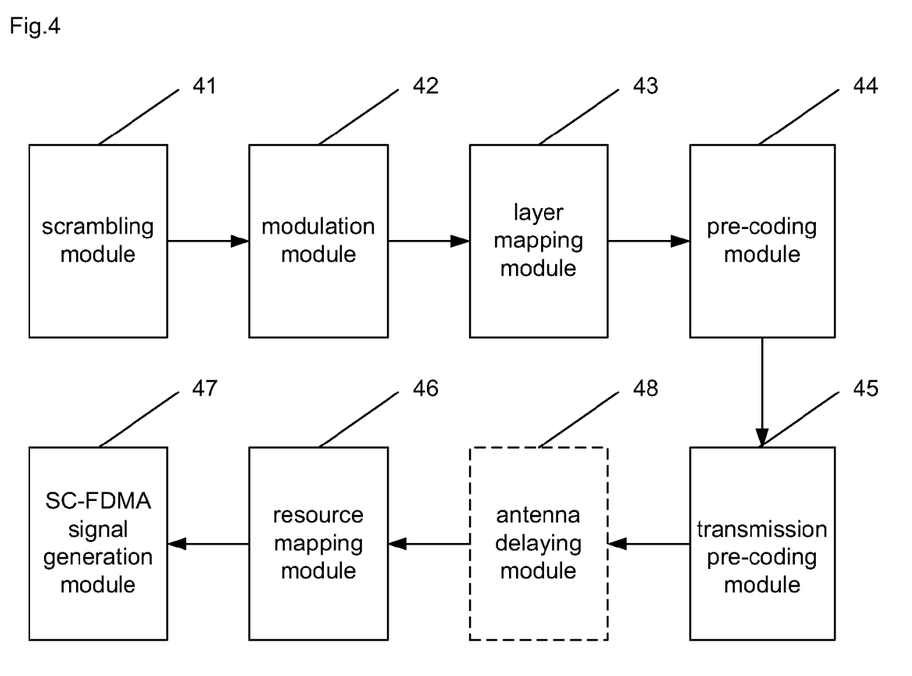
FIG. 4 is a schematic diagram of a structure of a multi-antenna signal processing device in an uplink system according to the disclosure.

In order to implement the above method, the disclosure also provides a multi-antenna signal processing device in an uplink system. As shown in FIG. 4, the device includes: a scrambling module 41, a modulation module 42, a layer mapping module 43, a pre-coding module 44, a transmission pre-coding module 45, a resource mapping module 46 and an SC-FDMA signal generation module 47, wherein the scrambling module 41 is configured to scramble a coded bit sequence corresponding to each codeword and to send a scrambled bit sequence corresponding to each codeword to the modulation module 42;

the modulation module 42 is configured to modulate the scrambled bit sequence corresponding to each codeword and to send a modulated complex symbol corresponding to each codeword to the layer mapping module 43;

the layer mapping module 43 is configured to perform layer mapping on the modulated complex symbol corresponding to each codeword and to send an obtained complex symbol on each layer to the pre-coding module 44;

the pre-coding module 44 is configured to perform pre-coding on the complex symbol on each layer and to send an obtained complex symbol corresponding to each transmitting antenna port to the transmission pre-coding module 45;

the transmission pre-coding module 45 is configured to perform transmission pre-coding on the complex symbol corresponding to each transmitting antenna port and to send an obtained complex symbol corresponding to each transmitting antenna port that has gone through transmission pre-coding to the resource mapping module 46;

the resource mapping module 46 is configured to perform resource mapping on the complex symbol corresponding to each transmitting antenna port that has gone through transmission pre-coding and to send an obtained complex symbol corresponding to each transmitting antenna port that has gone through resource mapping to the SC-FDMA signal generation module 47; and the SC-FDMA signal generation module 47 is configured to perform SC-FDMA signal generation on the complex symbol corresponding to each transmitting antenna port that has gone through resource mapping and to transmit a resulted signal from each transmitting antenna port.

The device may further include: an antenna delaying module 48 configured to perform antenna delaying on the complex symbol corresponding to each transmitting antenna port that has gone through transmission pre-coding and to send an obtained complex symbol corresponding to each transmitting antenna port that has gone through antenna delaying to the resource mapping module 46;

the transmission pre-coding module 45 may be further configured to send the obtained complex symbol corresponding to each transmitting antenna port that has gone through transmission pre-coding to the antenna delaying module 48; and the resource mapping module 46 may be further configured to perform the resource mapping on the complex symbol corresponding to each transmitting antenna port that has gone through antenna delaying.

Here, it should be noted that the scrambling module 41, modulation module 42, layer mapping module 43, pre-coding module 44, transmission pre-coding module 45, resource mapping module 46, SC-FDMA signal generation module 47 and antenna delaying module 48 are logical units of a terminal.

The specific processing by the pre-coding module, layer-mapping module and antenna delaying module in the device according to the disclosure has been described hereinbefore, which is not elaborated here.

What described are merely embodiments of the disclosure, and are not intended to limit the scope of the disclosure.

The invention claimed is:

1. A multi-antenna signal processing method in an uplink system, comprising:
   scrambling a coded bit sequence corresponding to each codeword to obtain a scrambled bit sequence corresponding to each codeword;
   modulating the scrambled bit sequence corresponding to each codeword to obtain a modulated complex symbol corresponding to each codeword;
   performing layer mapping on the modulated complex symbol corresponding to each codeword to obtain a complex symbol on each layer;
   performing pre-coding on the complex symbol on each layer to obtain a complex symbol corresponding to each transmitting antenna port;
   performing transmission pre-coding on the complex symbol corresponding to each transmitting antenna port to obtain a complex symbol corresponding to each transmitting antenna port that has gone through transmission pre-coding;
   performing resource mapping on the complex symbol corresponding to each transmitting antenna port that has gone through transmission pre-coding to obtain a complex symbol corresponding to each transmitting antenna port that has gone through resource mapping; and
   performing SC-FDMA signal generation on the complex symbol corresponding to each transmitting antenna port that has gone through resource mapping and transmitting a resulted signal from each transmitting antenna port.

2. The method according to claim 1, wherein performing the layer mapping is:
processing the modulated complex symbol corresponding to each codeword with a mapping-and-layer-interleaving matrix.

3. The method according to claim 1, further comprising: when performing the pre-coding,
varying an adopted pre-coding matrix according to each complex symbol, or according to an SC-FDMA symbol, or according to a time slot.

4. The method according to claim 1, further comprising: after performing the transmission pre-coding and before performing the resource mapping, performing antenna delaying on the complex symbol corresponding to each transmitting antenna port that has gone through transmission pre-coding, to obtain a complex symbol corresponding to each transmitting antenna port that has gone through antenna delaying; and
correspondingly, performing the resource mapping on the complex symbol corresponding to each transmitting antenna port that has gone through antenna delaying.

5. The method according to claim 2, wherein the processing the modulated complex symbol corresponding to each codeword with a mapping-and-layer-interleaving matrix is:
when 1 codeword is mapped to 2 layers, then:

$$\begin{pmatrix} x^{(0)}(i) \\ x^{(1)}(i) \end{pmatrix} = Q_1 \begin{pmatrix} d^{(0)}(2i) \\ d^{(0)}(2i+1) \end{pmatrix};$$

$$Q_1 = \begin{bmatrix} 1 & 0 \\ 0 & 1 \end{bmatrix};$$

$$i = 0, 1, \ldots, M_{symb}^{layer} - 1, M_{symb}^{layer} = M_{symb}^{(0)}/2;$$

When 2 codewords are mapped to 2 layers, then:

$$\begin{pmatrix} x^{(0)}(i) \\ x^{(1)}(i) \end{pmatrix} = Q_2(i \bmod 2) \begin{pmatrix} d^{(0)}(i) \\ d^{(1)}(i) \end{pmatrix};$$

$$Q_2(0) = \begin{pmatrix} 1 & 0 \\ 0 & 1 \end{pmatrix},$$

$$Q_2(1) = \begin{pmatrix} 0 & 1 \\ 1 & 0 \end{pmatrix};$$

$$i = 0, 1, \ldots, M_{symb}^{layer} - 1,$$

$$M_{symb}^{layer} = M_{symb}^{(0)} = M_{symb}^{(1)};$$

When 2 codewords are mapped to 3 layers, then:

$$\begin{pmatrix} x^{(0)}(i) \\ x^{(1)}(i) \\ x^{(2)}(i) \end{pmatrix} = Q_3(i \bmod 3) \begin{pmatrix} d^{(0)}(i) \\ d^{(1)}(2i) \\ d^{(1)}(2i+1) \end{pmatrix};$$

$$Q_3(0) = \begin{pmatrix} 1 & 0 & 0 \\ 0 & 1 & 0 \\ 0 & 0 & 1 \end{pmatrix},$$

$$Q_3(1) = \begin{pmatrix} 0 & 0 & 1 \\ 1 & 0 & 0 \\ 0 & 1 & 0 \end{pmatrix},$$

$$Q_3(2) = \begin{pmatrix} 0 & 1 & 0 \\ 0 & 0 & 1 \\ 1 & 0 & 0 \end{pmatrix};$$

$$i = 0, 1, \ldots, M_{symb}^{layer} - 1,$$

$$M_{symb}^{layer} = M_{symb}^{(0)} = M_{symb}^{(1)}/2;$$

When 2 codewords are mapped to 4 layers, then:

$$\begin{pmatrix} x^{(0)}(i) \\ x^{(1)}(i) \\ x^{(2)}(i) \\ x^{(3)}(i) \end{pmatrix} = Q_4(i \bmod 4) \begin{pmatrix} d^{(0)}(2i) \\ d^{(0)}(2i+1) \\ d^{(1)}(2i) \\ d^{(1)}(2i+1) \end{pmatrix};$$

$$Q_4(0) = \begin{pmatrix} 1 & 0 & 0 & 0 \\ 0 & 1 & 0 & 0 \\ 0 & 0 & 1 & 0 \\ 0 & 0 & 0 & 1 \end{pmatrix},$$

$$Q_4(1) = \begin{pmatrix} 0 & 0 & 0 & 1 \\ 1 & 0 & 0 & 0 \\ 0 & 1 & 0 & 0 \\ 0 & 0 & 1 & 0 \end{pmatrix},$$

$$Q_4(2) = \begin{pmatrix} 0 & 0 & 1 & 0 \\ 0 & 0 & 0 & 1 \\ 1 & 0 & 0 & 0 \\ 0 & 1 & 0 & 0 \end{pmatrix},$$

$$Q_4(3) = \begin{pmatrix} 0 & 1 & 0 & 0 \\ 0 & 0 & 1 & 0 \\ 0 & 0 & 0 & 1 \\ 1 & 0 & 0 & 0 \end{pmatrix};$$

$$i = 0, 1, \ldots, M_{symb}^{layer} - 1,$$

$$M_{symb}^{layer} = M_{symb}^{(0)}/2 = M_{symb}^{(1)}/2;$$

where i mod y represents calculating a remainder in dividing i by y, y∈{2,3,4}; $d^{(q)}(0), d^{(q)}(1), \ldots, d^{(q)}(M_{symb}^{(q)}-1)$ each represents a modulated complex symbol corresponding to a codeword q, q∈{0,1}; $M_{symb}^{(q)}$, represents a number of modulated complex symbols corresponding to the codeword q; $x^{(v)}(0), x^{(v)}(1), \ldots, x^{(v)}(M_{symb}^{layer}-1)$ each represents a modulated complex symbol corresponding to a layer v, v∈{0,1,2,3}; and $M_{symb}^{layer}$ represents a number of modulated complex symbols corresponding to one layer.

6. The method according to claim 3, further comprising: before performing the pre-coding,
agreeing, by a terminal and a base station, on a rule for varying the pre-coding matrix.

7. The method according to claim 4, further comprising: before the performing antenna delaying,
setting an antenna delaying matrix according to a number of transmitting antenna ports, a number of layers and a pre-coding matrix.

8. The method according to claim 7, wherein
when the number of transmitting antenna ports is 2 and the number of layers is 1, the antenna delaying matrix is:

$$D(i) = \begin{bmatrix} 1 & 0 \\ 0 & e^{-j2\pi i/2} \end{bmatrix};$$

when the number of transmitting antenna ports is 2 and the number of layers is 2, the antenna delaying matrix is:

$$D(i) = \begin{bmatrix} 1 & 0 \\ 0 & 1 \end{bmatrix};$$

when the number of transmitting antenna ports is 4 and the number of layers is 1, the antenna delaying matrix is:

$$D(i) = \begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix};$$

when the number of transmitting antenna ports is 4 and the number of layers is 2, and when the pre-coding matrix adopted is $$\begin{bmatrix} 1 & 0 \\ x & 0 \\ 0 & 1 \\ 0 & y \end{bmatrix} (x, y \in \{1, -1, j, -j\}),$$

the antenna delaying matrix is:

$$D(i) = \begin{bmatrix} 1 & 0 & 0 & 0 \\ 0 & e^{-j4\pi i/4} & 0 & 0 \\ 0 & 0 & 1 & 0 \\ 0 & 0 & 0 & e^{-j4\pi i/4} \end{bmatrix}$$

or $$D(i) = \begin{bmatrix} 1 & 0 & 0 & 0 \\ 0 & e^{-j4\pi i/4} & 0 & 0 \\ 0 & 0 & e^{-j2\pi i/4} & 0 \\ 0 & 0 & 0 & e^{-j6\pi i/4} \end{bmatrix};$$

when the number of transmitting antenna ports is 4 and the number of layers is 2, and when the pre-coding matrix adopted is $$\begin{bmatrix} 1 & 0 \\ 0 & 1 \\ x & 0 \\ 0 & y \end{bmatrix} (x, y \in \{1, -1, j, -j\}),$$

the antenna delaying matrix is:

$$D(i) = \begin{bmatrix} 1 & 0 & 0 & 0 \\ 0 & 1 & 0 & 0 \\ 0 & 0 & e^{-j4\pi i/4} & 0 \\ 0 & 0 & 0 & e^{-j4\pi i/4} \end{bmatrix}$$

or $$D(i) = \begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix};$$

when the number of transmitting antenna ports is 4 and the number of layers is 2, and when the pre-coding matrix adopted is $$\begin{bmatrix} 1 & 0 \\ 0 & 1 \\ 0 & y \\ x & 0 \end{bmatrix} (x, y \in \{1, -1, j, -j\}),$$

the antenna delaying matrix is:

$$D(i) = \begin{bmatrix} 1 & 0 & 0 & 0 \\ 0 & 1 & 0 & 0 \\ 0 & 0 & e^{-j4\pi i/4} & 0 \\ 0 & 0 & 0 & e^{-j4\pi i/4} \end{bmatrix}$$

or $$D(i) = \begin{bmatrix} 1 & 0 & 0 & 0 \\ 0 & e^{-j2\pi i/4} & 0 & 0 \\ 0 & 0 & e^{-j6\pi i/4} & 0 \\ 0 & 0 & 0 & e^{-j4\pi i/4} \end{bmatrix};$$

wherein i=0, 1, . . . , $M_{symb}^{ap}-1$; $M_{symb}^{ap}$ represents a number of modulated complex symbols corresponding to each antenna port; $M_{symb}^{ap}=M_{symb}^{symb}$; j represents an imaginary unit.

9. A multi-antenna signal processing device in an uplink system, comprising: a scrambling module, a modulation module, a layer mapping module, a pre-coding module, a transmission pre-coding module, a resource mapping module and a Single Carrier Frequency Division Multiple Access (SC-FDMA) signal generation module, wherein
the scrambling module is configured to scramble a coded bit sequence corresponding to each codeword and to send a scrambled bit sequence corresponding to each codeword to the modulation module;
the modulation module is configured to modulate the scrambled bit sequence corresponding to each codeword and to send a modulated complex symbol corresponding to each codeword to the layer mapping module;
the layer mapping module is configured to perform layer mapping on the modulated complex symbol corresponding to each codeword and to send an obtained complex symbol on each layer to the pre-coding module;

the pre-coding module is configured to perform pre-coding on the complex symbol on each layer and to send an obtained complex symbol corresponding to each transmitting antenna port to the transmission pre-coding module;

the transmission pre-coding module is configured to perform transmission pre-coding on the complex symbol corresponding to each transmitting antenna port and to send an obtained complex symbol corresponding to each transmitting antenna port that has gone through transmission pre-coding to the resource mapping module;

the resource mapping module is configured to perform resource mapping on the complex symbol corresponding to each transmitting antenna port that has gone through transmission pre-coding and to send an obtained complex symbol corresponding to each transmitting antenna port that has gone through resource mapping to the SC-FDMA signal generation module; and the SC-FDMA signal generation module is configured to perform SC-FDMA signal generation on the complex symbol corresponding to each transmitting antenna port that has gone through resource mapping and to transmit a resulted signal from each transmitting antenna port.

10. The device according to claim 9, further comprising:

an antenna delaying module configured to perform antenna delaying on the complex symbol corresponding to each transmitting antenna port that has gone through transmission pre-coding and to send an obtained complex symbol corresponding to each transmitting antenna port that has gone through antenna delaying to the resource mapping module;

the transmission pre-coding module is further configured to send the obtained complex symbol corresponding to each transmitting antenna port that has gone through transmission pre-coding to the antenna delaying module; and the resource mapping module is further configured to perform the resource mapping on the complex symbol corresponding to each transmitting antenna port that has gone through antenna delaying.

* * * * *